US009009581B2

(12) United States Patent
Herberger et al.

(10) Patent No.: US 9,009,581 B2
(45) Date of Patent: Apr. 14, 2015

(54) SYSTEM AND METHOD FOR DYNAMIC CONTENT INSERTION FROM THE INTERNET INTO A MULTIMEDIA WORK (75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 1428 days.

(21) Appl. No.: 12/240,402

(22) Filed: Sep. 29, 2008

(65) Prior Publication Data
US 2009/0089651 A1 Apr. 2, 2009

Related U.S. Application Data (60) Provisional application No. 60/975,719, filed on Sep. 27, 2007.

(51) Int. Cl.
*G06F 17/00* (2006.01)
*G06F 17/30* (2006.01)

(52) U.S. Cl.
CPC .... *G06F 17/30056* (2013.01); *G06F 17/30017* (2013.01); *G06F 17/30058* (2013.01)

(58) Field of Classification Search
CPC .............. G06F 17/30017; G06F 17/30781; G06F 17/30056; G06F 17/30058; H04N 21/4782; H04N 21/6125; H04N 21/858
USPC ........................ 715/234, 248, 714, 716, 723
See application file for complete search history.

(56) References Cited

U.S. PATENT DOCUMENTS

| 6,211,874 | B1 * | 4/2001 | Himmel et al. .......... 715/781 |
| 6,301,586 | B1 * | 10/2001 | Yang et al. .................... 1/1 |
| 6,397,036 | B1 * | 5/2002 | Thean et al. ............... 434/350 |
| 6,462,754 | B1 | 10/2002 | Chakrauborty et al. |
| 6,686,918 | B1 | 2/2004 | Cajolet et al. |
| 6,760,885 | B1 | 7/2004 | Hyman et al. |
| 7,039,643 | B2 * | 5/2006 | Sena et al. ................. 707/691 |
| 7,739,599 | B2 * | 6/2010 | Patten et al. ............... 715/723 |
| 8,156,176 | B2 * | 4/2012 | Lerman et al. ............ 709/203 |
| 2002/0116716 | A1 | 8/2002 | Sideman |
| 2002/0167541 | A1 | 11/2002 | Ando et al. |
| 2003/0001904 | A1 | 1/2003 | Rosen et al. |
| 2003/0078939 | A1 * | 4/2003 | Ma .......................... 707/104.1 |
| 2003/0090504 | A1 | 5/2003 | Brook et al. |
| 2003/0146915 | A1 | 8/2003 | Brook et al. |
| 2003/0184579 | A1 | 10/2003 | Zhang et al. |

(Continued)

OTHER PUBLICATIONS

Steve Grisetti et al., Adobe Premiere Elements 2 in a Snap, Sams Publishing, Dec. 2005, 6,8,9,15,19,20,55,56,58,70,116,117,137.*

(Continued)

*Primary Examiner* — Scott Baderman
*Assistant Examiner* — Howard Cortes
(74) *Attorney, Agent, or Firm* — Fellers, Snider, Blankenship, Bailey & Tippens, P.C.; Terry L. Watt (57) ABSTRACT

According to a preferred aspect of the instant invention, there is provided a system and method for supplementing a multimedia work with content from the Internet. The instant method utilizes a combined multimedia editing and browsing functionality in one multimedia editing program. The instant invention will make it possible for casual users to be able to extract multimedia data from a website and include that data in a project. Multimedia content that is not supported by the editing component will be automatically converted to a format that is supported.

4 Claims, 8 Drawing Sheets

(56) References Cited

U.S. PATENT DOCUMENTS

| | | | |
|---|---|---|---|
| 2004/0145611 A1 | 7/2004 | Ogawa et al. | |
| 2005/0114784 A1* | 5/2005 | Spring et al. | 715/762 |
| 2005/0144305 A1* | 6/2005 | Fegan et al. | 709/231 |
| 2005/0165843 A1* | 7/2005 | Capps et al. | 707/104.1 |
| 2005/0231513 A1 | 10/2005 | LeBarton et al. | |
| 2005/0237326 A1 | 10/2005 | Kuhne | |
| 2006/0171380 A1* | 8/2006 | Chia | 370/352 |
| 2006/0259588 A1 | 11/2006 | Lerman et al. | |
| 2006/0259589 A1* | 11/2006 | Lerman et al. | 709/219 |
| 2007/0067724 A1 | 3/2007 | Takahashi et al. | |
| 2007/0226238 A1* | 9/2007 | Kiilerich et al. | 707/101 |
| 2008/0301280 A1* | 12/2008 | Chasen et al. | 709/224 |

OTHER PUBLICATIONS

No Author, TechSmith Camtasia Studio 3.0 Online Help Manual PDF edition. Camtasia Studio 3.0 Released Jun. 25, 2005, 109-110.*

TechSmith, Camtasia Studio 3.0 Online Help, Sep. 24, 2005, Pages.*

MediaCollege.com, How to Protect Streaming Video From Being Stolen, Aug. 13, 2007, pp. 1-2 http://www.mediacollege.com/video/streaming/protect/.*

TechSmith, SnagIT, Getting Started Guide V.8.0, 2006, pp. 1-18.*

* cited by examiner

SYSTEM AND METHOD FOR DYNAMIC CONTENT INSERTION FROM THE INTERNET INTO A MULTIMEDIA WORK

This application claims the benefit of U.S. Provisional Patent Application Ser. No. 60/975,719 filed on Sep. 27, 2007 and incorporates said provisional application by reference into this document as if fully set out at this point.

FIELD OF THE INVENTION

The present invention relates generally to the field of multimedia editing and, more generally, to editing multimedia works where at least a portion of the source material is located remotely from the user.

BACKGROUND OF THE INVENTION

Interest in video editing, including the creation of videos from still images and separate audio content, is at an all time high. In recent years programs specifically created for editing such content have undergone a steady improvement in functionality. In the past such editing programs were limited to operations on a single type of multimedia material, for example video editing programs were only able to import and edit video material and its associated audio content. Similarly, in the case of audio editing/creation programs, these sorts of programs were only able to process audio material. Content of a type that was different from that which was the focus of the program was not accepted.

The increasing availability of multimedia data and the fact that more and more digital devices can accommodate and play multiple types of media has lead to a corresponding increase in users' expectations with respect to the variety of media types that they expect their software to be able to read, write, and/or perform.

The importance of the Internet with respect to the foregoing has similarly increased. The Internet for most users is a primary means of acquiring, displaying, and sending data having multimedia content—be it visual content like text (information) or images, acoustic content such as an audio file (e.g., a MP3 file), or combined visual and audio content such as video (e.g., a .WMV file). Multimedia in some sense defines the user's perception of the Internet. Of course, the World Wide Web (a system of interlinked, hypertext documents accessed via the Internet) continues to grow without apparent limitation and contains a rich mixture of multimedia content, including photos, video, audio, etc.

Multimedia content that is available for a user to view, hear, download and/or buy might contain any combination of images, video, and/or audio material. However, a user—and especially an inexperienced one—who wishes to utilize multimedia content that is found on the web may not be able to determine whether that content will be in a format that makes it usable within his or her editing program of choice. Determining which content might be usable within a particular program may pose a substantial difficulty for the novice. The user who finds content on the Internet that would be desirable for inclusion in a multimedia project might experience frustration, program crashes, etc., in attempting to import such content, since it is not generally the case that editing programs support all of the formats of multimedia data that might be encountered via the Internet. Thus, if a user intends to utilize content from an Internet source, and especially if content from a website is to be included in the project, the user will likely be required to perform a number of steps to import it, if it can be imported at all. This problem could apply to any sort of multimedia data including video, image, textual, and/or audio data.

In a typical scenario, a user will be browsing the Internet in search of content to include in a multimedia work or, perhaps, the user will just be browsing for recreation. In either case, while browsing, the user might notice content that he or she would like to integrate into a current or future multimedia project. Depending on the type of data, it may be necessary for the user to perform a number of steps in order to import the data into a project. Extraction and integration of image data is surely one of the most commonly encountered tasks of this sort. Although this task might be more readily accomplished than others (e.g., importing video), it still can pose a problem for the novice.

In a typical scenario, a user will need to perform the following sorts of steps in order to incorporate Internet media items into a multi-media project:

An Internet browser program will be activated;
A multimedia editing program will be activated;
The user will need to transfer to the browser and navigate to the web site that contains the content;
The image data that the user wants to integrate into a multimedia project will be identified within the browser and selected;
The selected image data will be extracted from the web page and stored in program memory (e.g., via a system "copy" command) and stored somewhere on the user's hard disk;
The user will transfer to the editing program;
The multimedia project will be selected and opened;
Within the editing program, the file containing the image data will need to be located from within a file selection dialog box; and,
The image data will be imported into and integrated into the current multimedia editing project.

As is suggested above, in this sort of scenario the user may be required to switch back and forth between at least two programs, remember the previously assigned file name(s) and the directory paths that lead to them, etc. These sorts of tasks are ill addition to learning to master the features of the multimedia editing program. Of course, the foregoing assumes that the file type of the selected content is supported by the editing program, which may not be known for certain until the user actually tries to import the media items. If the file type is not supported, this further complicates and extends the steps (e.g., a conversion step will be necessary) and increases the effort required of a user.

In view of the complexity of the tasks listed above, a casual user may not even attempt to include data from the Internet in a multimedia project, even if such would be desirable. In the case of audio and video data, there can be further complexities. In many cases the integration of audio or video data from a website is a near-impossible task for the casual user because that sort of media is often playing in the background of a website (e.g., audio content) or contained within a graphical user interface designed for replay of content only (i.e., such interfaces may not provide an option to export or store the associated media, for example, video data).

Thus, what is needed is a system and method that allows a casual user to easily and quickly insert content from the Internet into a multimedia project. The system will need to accommodate a variety of different multimedia data types and be able to import most data formats. Finally, the system should consist of a single program (or appear to be a single program) to reduce the need to for the user to switch between a browser and an editing program and otherwise reduce the number of steps in the process discussed previously.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for multimedia editing which provides for dynamic and automatic content insertion from the Internet. The instant invention will allow users to quickly and easily select multimedia content found on an Internet website from within a browser type interface that is embedded within a multimedia editing application. The system will be designed to extract multimedia data of almost any kind and format and to automatically convert the selected multimedia data to match the requirements of the current project. The selected data will then be incorporated into the multimedia project.

The instant method will preferably provide the user with a multimedia editing program which features an embedded browsing interface which the user can utilize to navigate to and select content from a website. The instant invention will then, depending on the type of the multimedia data, perform a series of steps which will automatically extract the selected data from the website, convert it to a format that is supported by the multimedia editing application, and, finally, insert the converted content into the current multimedia project. These steps will preferably be largely invisible to the user, i.e., the steps will be performed automatically and the user will preferably not be informed as these steps are executed.

The system and method will preferably be designed to allow integration of multimedia content of virtually any format that can be viewed or heard via an embedded browser into a multimedia editing application. The instant invention will be generally intended to give users an efficient way to enhance their multimedia projects with content that might originate in any corner of the world that is reachable by the Internet. The instant invention will preferably automatically manage potential problems regarding the format of the multimedia data to ensure that the multimedia editing application supports and accepts the selected and desired content.

In brief, the instant invention will provide the casual user with an easy method of increasing the entertainment value of a personal multimedia work by allowing a user to utilize content located on a website. The user will then be freed to focus on the creative aspects of the project rather than worrying about data types and formats. This functionality is accomplished by providing the user with a multimedia editing application that contains an embedded Internet browser component, wherein the browser aspect and the multimedia editing aspect both include a feature set of the sort normally expected of both types of programs.

Additionally, the user interface associated with the Internet browser will be provided with additional functionality beyond that typically offered in a conventional browser to assist the user in selecting and extracting multimedia content from websites. The selection and extraction function will likely differ depending on the type of multimedia; however, the associated processing steps for each data type will preferably be designed to be carried out automatically. Thus, in the preferred embodiment the user will only need to select the desired content from within the browser and the instant invention will thereafter automatically extract and insert it directly into the current multimedia project. The Internet browsing interface will preferably provide the user with controls that activate the extraction and conversion functionality for each multimedia data type.

In another preferred embodiment, the instant invention will automatically analyze the currently viewed website and extract the multimedia content contained there. The user will then be presented with a graphical user interface that catalogs and displays the available and usable multimedia data items found on a web page or within a web site for selection by the user. A selection of a multimedia data item will preferably initiate the conversion and insertion of the previously extracted multimedia data.

According to a preferred embodiment, the instant invention will preferably begin with the activation of the multimedia editing program and the subsequent editing of a multimedia work. The integrated Internet browser functionality will preferably be selectable from within the graphical user interface of the multimedia editing program. After the browsing component is activated, a user interface suitable for Internet browsing will be displayed to the user. The user will preferably be able to initiate the switch from the multimedia editing component to the Internet browsing component at any time. Additionally, the user will be able to switch between the editing and browsing components as often as it is desired. The browsing and editing components are intended to have the full functionality of stand alone programs of these types, but that is not a requirement. The instant invention will preferably be an integrated combination of the two programs which are designed to allow media items to be readily passed between the browser component and editor component.

The user will generally begin by creating a new work or editing an existing multimedia work. When the user wishes to find and insert material from the Internet, he or she will preferably select a control in the graphical user interface of the editing program that activates the graphical user interface of the Internet browsing component. The user will preferably then be presented with the full functionality of a typical Internet browser, which would typically include an address bar for typing an Internet address, buttons for controlling the Internet browsing activities, and additional user controls that allow the user to initiate the content extraction process.

In the next preferred step, the user will search the Internet for the content that he or she would like to insert into the current multimedia work. As the user browses the Internet from within the editing program and discovers content that would be desirable to add to the existing multimedia work, he or she will be able to define, select or identify the target content and will activate one of the user controls provided. In some preferred embodiments, the instant invention will provide a listing or display of the multimedia data items found on the current web page or website. However, generally the user will manually select the desired content and initiate the content extraction process by selecting the appropriate control item (e.g., button). The steps that follow will depend on the type of multimedia data that the user wants to extract.

In the next preferred step the instant invention will preferably analyze the content extraction request and, depending on the selected multimedia data type, a series of different steps will be initiated. In the event that the user desires to extract text data from a website, the instant invention will preferably detect the text that has been selected by the user. Preferably, the text selection will be carried out according to methods well known to one of ordinary skill in the art, e.g., by selection via a mouse or a similar input device. After the instant invention detects the selected text, it will be extracted and stored. In some embodiments, a single cache might be used so that the next selected data item would overwrite whatever was stored there earlier. In such a scenario, it will be preferred that data items would be automatically inserted into the user's multimedia work upon selection or automatically inserted from the cache the next time the program is executed. However, in another preferred embodiment the instant invention will provide some means of storing multiple media items on disk or within some other nonvolatile storage. Such a more-permanent type of storage will additionally provide the user with the option to store large numbers of media items for later use as they are needed.

The detection of the media type will preferably be carried out either automatically by the instant invention or will be determined by reference to the control item selected by the user. The automatic detection will preferably be accomplished by analyzing the source code of the designated web page and by comparing the analyzed source code with the selected multimedia data, thereby determining its data type.

Returning to the example discussed previously, if the selected data is text, the instant invention will preferably determine that fact and store the content either in permanent storage or in a temporary cache. In the next preferred step, the instant invention will preferably automatically insert the selected content and, in case of textual material, the instant invention will preferably provide the user with a graphical user interface wherein the user can choose the format in which the textual content will be inserted into the current multimedia work. In addition, after the insertion, the user will preferably be able to change the font size, color, alignment, etc., of the text as is conventionally done. In the event that the website restricts the selection of textual content, i.e., if generic extraction is not possible, the instant invention will preferably take a screenshot, with the screenshot being subsequently inserted into the multimedia work. In such an instance the user will likely not be able to change the properties of the text captured via screenshot without further processing (e.g., OCR).

The selection and extraction of image data from a website will typically operate somewhat differently. Preferably, the user will select the desired image data in a currently open website within the browser component of the instant invention. This could be done by selecting (e.g., clicking) an individual image or by activating a feature of the instant invention which allows a user to simultaneously select several different images. Additionally, the user might be able to select an image by simply pointing on that image with the mouse or any other user input device. The instant invention will then, in contrast to textual content extraction, determine the source address of the desired image data, i.e., the location where the image data is stored, and will obtain and download the image data. The image data will preferably be stored in a program cache, in named files, etc., however, storing it on permanent storage is also possible.

In the next preferred step, the instant invention will automatically insert the image data at the current editing position of the multimedia work. In another preferred embodiment, the user will, before the insertion of the content, be able to perform some basic editing on the extracted image. Preferably, the user will be allowed to crop, remove red-eye, and adjust horizontal adjustment, etc. If the website does not allow the desired image to be extracted, the instant invention will preferably take a screenshot of the image as it appears on the user's monitor which will then be inserted into the edited multimedia work.

The content extraction processes associated with video and audio data will be similar. That being said, the process of selecting and extracting audio or video content from a website may not be as straightforward as it is for image or text data. Generally speaking, the audio and video content in websites may not be readily available for easy access and retrieval. Often the audio content will be present in the form of background music or only be accessible via a replay application. Audio data that is placed on a website in a directly accessible form (e.g., downloadable as an MP3 file) is more the exception than the rule. However, all of the above-mentioned methods by which audio data might be distributed will be preferably supported by the instant invention.

As was previously noted, the general steps that will be required to extract video and audio data will often be similar because video is frequently distributed over the Internet in a fashion similar to that described above for audio data. Video data that are found on the Internet will often be accessible only via a replay application and download of video stored in this format will usually not be provided by the website. To make clearer the differences in the way that audio and video data will be handed, each will be discussed separately below.

In a preferred embodiment, when a user wants to extract audio content from a website, he or she will activate a graphic control item (e.g., an on-screen button) that has been provided for that purpose. In a next preferred step, the instant invention will automatically analyze the source code of the website and attempt to find the appropriate file to download. However, as was indicated previously, most audio data files are not available as direct downloads, therefore the instant invention will not be able to find a direct download link. In such a circumstance, the instant invention will preferably direct the user to replay the audio data, which the user will preferably do by restarting a replay tool or by re-visiting the website (in case the audio data is automatically activated upon entry into the web site). After the user has caused the selected audio work to begin playing, the instant invention will preferably record the audio data as it plays. Typically, the resulting recording will be an analogue capture of the music as it is played. The instant invention will preferably sense when the audio replay has ended and will accordingly stop the recording process.

Preferably, the audio data will be stored where it can be found again by the user and accessed by the editing component of the instant invention. Additionally, the instant invention will preferably convert the audio data to a format that is useable by the editing component before it is stored, if that is necessary. After the audio material has been stored or in conjunction with that step, it will preferably be automatically inserted into one or more tracks of the current multimedia work (e.g., two tracks would typically be used if the audio were stereo). If, however, the selected audio material is available for direct download, the instant invention will be able to recognize that fact via analysis of the source code of the website and will initiate a direct download of the audio file. As part of this process, the instant invention will preferably determine the format of the audio work and, if necessary, convert it into a format that is supported by the editing program. After the conversion process (if any) is completed, the instant invention will preferably insert the audio material into the appropriate tracks of the multimedia editing program.

In case of extracting video content, the user may be able to select a direct download link for the individual video file. If so, it will be downloaded per the user's request. However, more typically the video content will usually be embedded in a replay tool that is part of the website. Therefore, the preferred solution in such cases will be similar to that discussed above in connection with audio data. Upon receipt of a user selection, the instant invention will preferably analyze the web page source code. In a next step, the instant invention will preferably compare the analysis results and the URL of the web site with a command file. This file will preferably contain operating instructions that the instant invention will follow depending on the URL of the web site and depending on how the video data is stored. Such a command file will preferably be part of the video extraction process and, additionally, it will preferably be provided to the user by the instant inventors and it will be written in a proprietary format not readily accessible by the end user. Note that in some preferred embodiments the command file will contain instructions for interfacing with a commercial web site the user has paid to have the right to download media items from. If the website URL is present in the command file, it will preferably be used during the media extraction process, which will preferably take place automatically and without intervention by (or notice to) the user. Preferably, the command file will be periodically updated via the Internet.

If, however, the selected website address URL is not contained within the command file, the instant invention will preferably proceed by downloading/converting the video data file if it is directly accessible. Then, the downloaded video will preferably be inserted into the multimedia work.

On the other hand, if a direct download with help of the command file or by directly accessing the video data file is not possible, the user will be asked to replay of the video content from the beginning and the instant invention will record the video content as it plays. This will preferably be accomplished through a screenshot based system, wherein every frame is captured via a screenshot of the video window and the audio data is recorded as well. The instant invention will preferably sense when the video playback has ended and will stop the recording.

In the preferred next step, the captured individual screenshots will be reassembled to create the video content and the recorded audio material will be added to recreate the video. The process of reconstructing the original video from the screenshots and from the audio data will preferably result in a video clip that is in a format that is supported by the multimedia editing program. The reconstructed video content will then preferably be inserted into the multimedia editing work.

It should be clear that an approach such as this would be a tremendous aid to the user who wants to enhance the experience of his or her multimedia work with content from other sources, be that content audio, video, image or text. With an approach that features an embedded Internet browser and makes it possible for a user to automatically (or near automatically) extract content, convert it, and insert it into a multimedia work, a user will be able to use the instant invention to quickly create multimedia works with a more elaborate feel to it. The system of the instant invention is intended to give the casual user an efficient and simple means of supplementing a personal multimedia work with content from the Internet, when this content includes audio, video, image or text. The instant invention will only need a selection of the desired content by the user and, after that, the selected content will be automatically processed and inserted.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Referring now to the drawings, wherein like reference numerals indicate the same parts throughout the several views, there is provided a preferred system and method for multimedia editing with dynamic content insertion from the Internet. The instant system allows for the quick, flexible, and easy integration of multimedia content and text from the Internet into a multimedia work. The system will be useable by a casual user and will feature a multimedia editing program that contains an embedded browsing section. Additionally, the content extraction aspect of the instant invention preferably reads and converts (to an acceptable format, if necessary) multimedia content and inserts it into the target work without intervention by—or notice to—the end user.

By way of general explanation and in accord with the preferred embodiment, it is to be understood that when the terms "multimedia" or "media' are used herein that term will preferably be broadly interpreted to include text, video, audio, etc., and any combination of same (e.g., text with audio).

For purposes of the instant embodiment it should be understood that the invention preferably seeks to provide a process by which users can enhance their projects with multimedia material, be it video content, audio content, image content or textual content, located remotely from the user. The instant invention will preferably automatically determine the best approach for extracting the desired content. The extracted content will then preferably be converted to a format that is supported by the user's multimedia editing program before it is inserted into the project.

The instant invention will additionally and preferably provide the user with options that control the integration of content into the work (e.g., the user will preferably be able to control the font, style, etc., of text that is to be inserted as well as the time at which it is inserted).

In some preferred embodiments, the user will be permitted to accumulate multiple media items for later inclusion in the work. The instant invention will preferably provide a file-based (or other) storage area into which the user might be able to store content that is discovered during an Internet browsing session. Preferably the user will be protected when transitions between the editing and browsing functionalities of the instant invention in that he or she will not have to worry about data loss. The workflows and additional specifications regarding the instant invention will be described in more detail in the text that follows.

Figure 1:
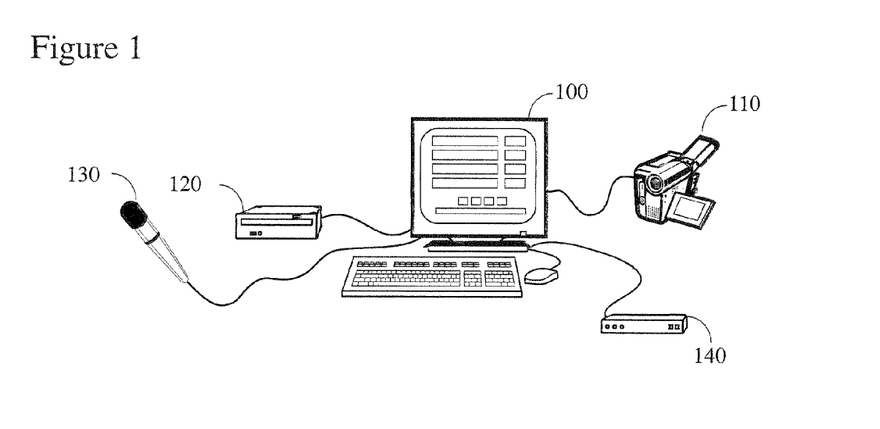
FIG. 1 depicts the general working environment of the instant invention.

As is generally indicated in FIG. 1, at least a portion of the instant invention will be implemented in form of software running on a user's computer 100. Such a computer will have some amount of program memory and hard disc storage (whether internal or accessible via a network) as is conventionally utilized by such units. Additionally it is possible that an external camera 110 of some sort will be utilized with—and will preferably be connectible to—the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g., in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally a microphone 130 might be utilized so that the user can add voice-over narration to a multimedia work or can control his or her computer via voice-recognition software and additionally a CD or DVD burner 120 could be useful for storing content on writable or rewritable media. Additionally to that an Internet access device 140, preferably a router, will be connected to the networking card contained in the computer to gain access to the Internet.

Figure 2:
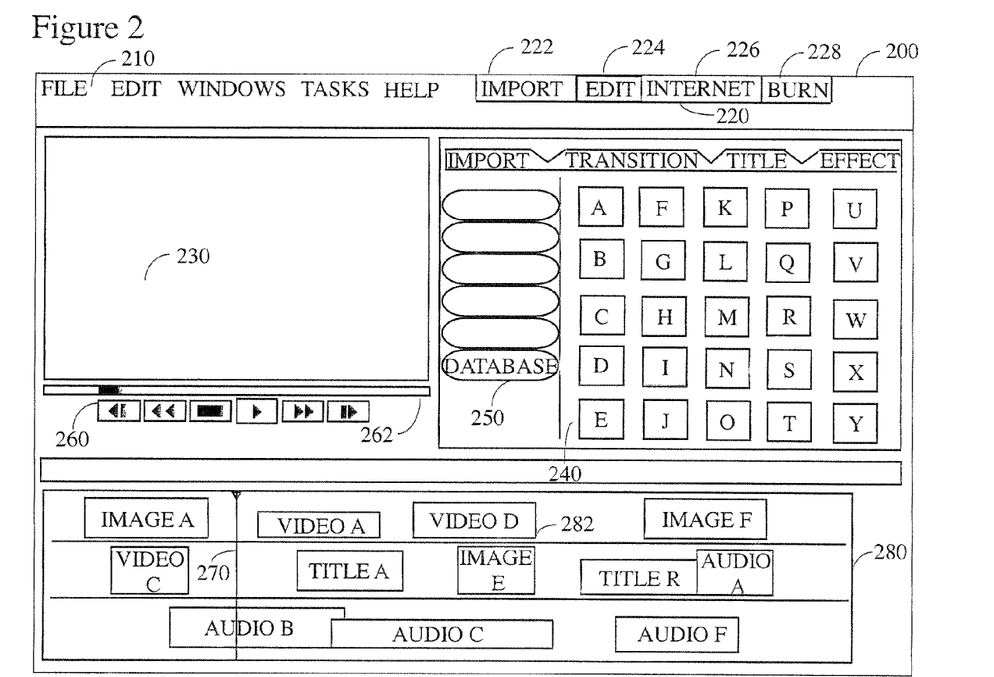
FIG. 2 illustrates the preferred graphical user interface of the editing component of the multimedia editing program.

Turning next to FIG. 2, this figure illustrates the preferred graphical user interface of the editing section of the multimedia editing program as it might appear on the user's computer screen or other display device. As is indicated in this figure, the user will preferably be presented with a computer screen display 200 that provides access to the functionality of a multimedia editing program. For example, and as is typical for such editing programs, menu sections 210 will be provided to allow a user to interact with the underlying program and would typically allow the user to browse and add new multimedia material into the multimedia work. Additionally these sections will preferably allow the user to switch between different multimedia works, to change the current task, and to request help when needed. The graphical user interface will also preferably provide controls 220 that allow the user to quickly change between different aspects of the editing program. By activating these controls, the user will preferably be able to instruct the editing program to import content 222, to edit content 224 (which is shown as currently selected in FIG. 2), to activate the Internet browsing functionality 226, and to store the edited and created multimedia work on computer readable media 228. A preview screen 230 will preferably be provided to allow the user to monitor the effects of menu choices. Additionally the user will preferably be provided with a section that allows for selection and arrangement of source material 240, wherein the content of this section will change according to which menu option 250 is currently active.

On-screen transport controls 260 will preferably be provided and will preferably be styled to resemble their counterparts on a conventional VCR. A principal use for such controls 260 will be to control the playback of the digital multimedia work via functions such as rewind, play, stop/record, fast forward etc. Those of ordinary skill in the art will recognize that such transport controls 260 are commonplace and well known in multimedia editing programs.

It is also typical in such programs to devote some portion of the screen to a timeline display 262 wherein the complete running time of the digital video work is displayed. Additionally the user will preferably be provided with a plurality of tracks 280, wherein the type of media that is contained within each track can be freely allocated by the user. Usually the user will be expected to provide the data needed to fill at least one track with digital material 282, with the simultaneous playing of all tracks preferably constituting a performance of the multimedia work. Further provided in this graphical user interface is a notification bar 270 which will inform the user about the current position of the editing process in the multi-track arrangement.

Figure 3:
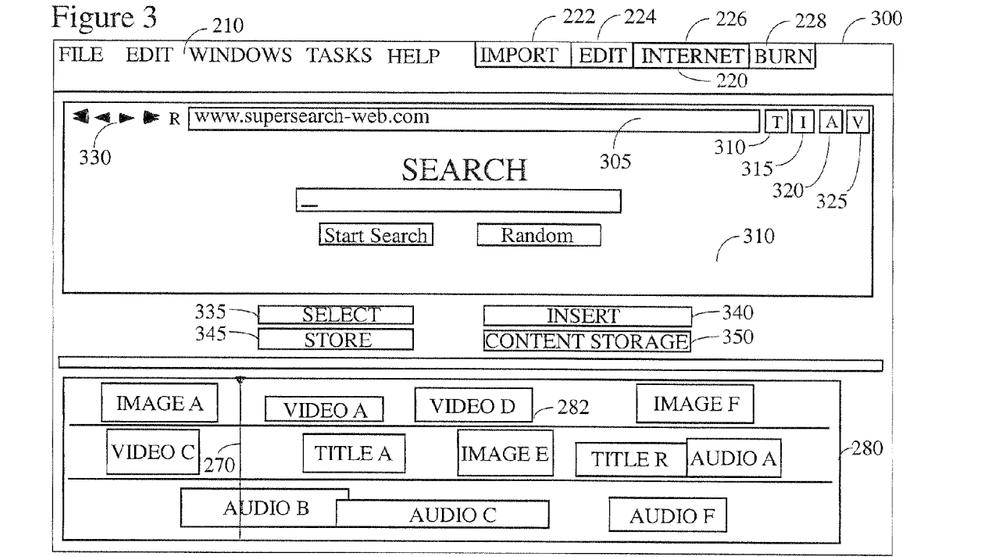
FIG. 3 contains an illustration of the preferred graphical user interface of the Internet browsing component of the multimedia editing program.

FIG. 3 illustrates the preferred graphical user interface of the instant invention that will be presented to the user when operating the internal browser 226. The user will preferably be presented with a computer screen display 300 which contains a display of components of the sort indicated in this figure. In FIG. 3, the greatest part of the graphical user interface is occupied by a browser window 310 which will contain and display the content of Internet sourced websites. The user will preferably be provided with at least a minimal browser interface, including an address bar 305 into which the user can enter the addresses of desired websites. Additionally, well known navigation user controls 330 will preferably be provided to allow the user to move forward or backward within his or her browsing history.

To support the functionality of the instant invention, a number of other controls will preferably also be provided. For example, the user will preferably be able to initiate the extraction of multimedia content of different kinds by selecting the appropriate control. For example, activation of the control for text 310 will initiate the processes associated with the extraction of textual content from a website, activation of the user control for image 315 will initiate the processes associated with the extraction of image content from a website. Similarly, the activation of the user control for audio 320 will activate the processes associated with the extraction of audio content from a website and the activation of the user control for video content 325 will activate the processes associated with the extraction of video content from a website. Additionally, the instant invention will also preferably provide controls that allow the user to activate the processes and functionalities associated with the extraction process independent of the media type—the instant invention will then determine the media type.

The controls discussed above will preferably extract information identified by the user via the "select" button 335. Additionally, the user will also preferably be able to instruct the instant invention to automatically insert 340 the currently selected content into the multimedia work. Preferably, a multi-track 280 approach to editing will be a part of the graphical user interface. The user will also be able to instruct the instant invention to store 345 the currently selected media content rather than (or in addition to) inserting it into the work. The content will preferably be stored in a computer readable form for a possible later use. Additionally the user will preferably be able to access the storage by activating the corresponding user control 350.

Figure 4:
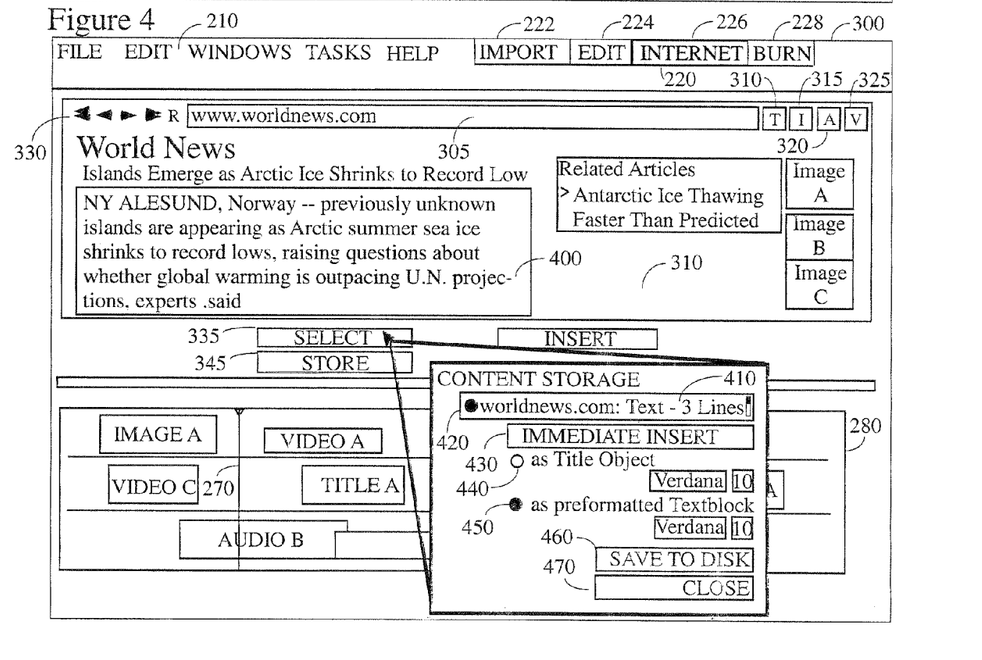
FIG. 4 illustrates how the preferred graphical user interface of the instant invention might appear when extracting textual content from the Internet.

Turning now to FIG. 4, this figure illustrates the preferred graphical user interface of the instant invention as it might appear when extracting textual content from the Internet. In this example, the user has selected a part of a website 400, by using a mouse. After activating the "select" user control 335 the instant invention will preferably provide the user with a display of options associated with the extraction of textual content from a website. The display will preferably provide information about the selected content and the source of the content 420, additionally the user will preferably be able to insert the content into the multimedia work 430 or store it. The user will be able to insert textual material as a title object 440 and will also be able to select the font type and font size. Additionally, the user might choose to insert the content as preformatted text block 450, wherein the user will preferably be able to define the font type and font size. The user will preferably be able to store the extracted content for later use. If the user has completed his or her selection of textual content he or she can choose to close the display via menu item 470.

Figure 5:
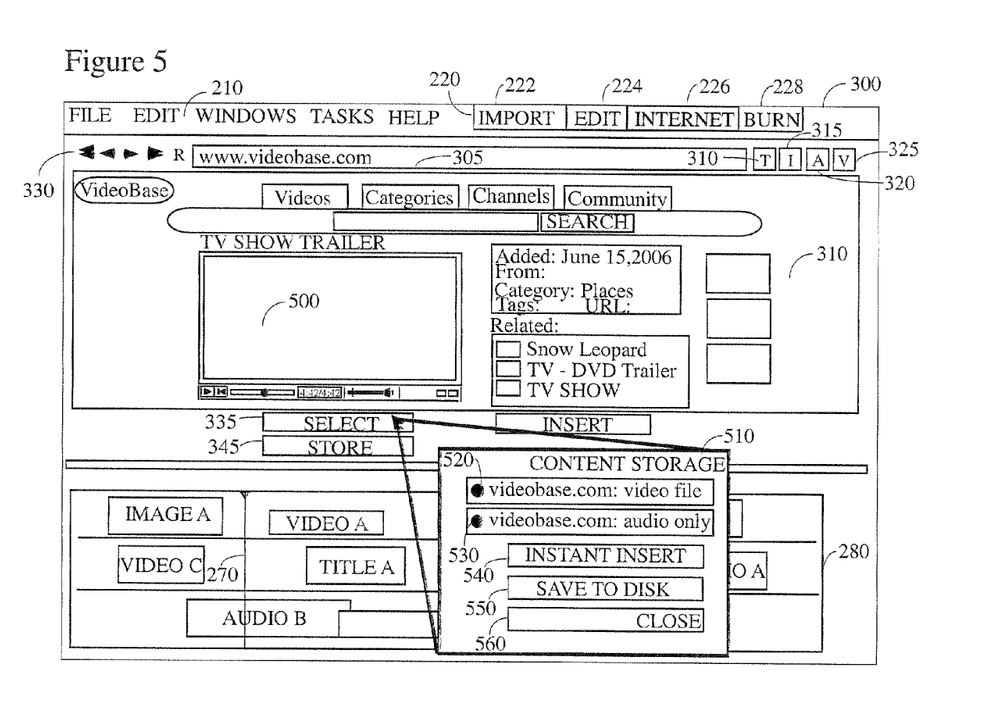
FIG. 5 contains an illustration of the preferred graphical user interface of the instant invention when extracting video content from the Internet.

Turning next to FIG. 5, this figure illustrates the preferred graphical user interface of the instant invention as it would appear when extracting video content from the Internet. The user will preferably navigate to a website containing video material or be taken there (e.g., via a bookmark). The video information will preferably be displayed within window 500. In the event that the user decides to extract material from the website either by selecting quick access button 325 or by using the "select" user control 335, the instant invention will preferably provide the user with a display 510 of the available options. The menu choices will preferably allow the user to extract the video file only 520, the audio content of the video only 530, the complete video, etc. The user will also preferably be able to select an "instant insert" 540 option, wherein the video material will be automatically extracted and inserted. Alternatively, the user might choose to store the video content 550. If the user decides to end the process of extracting video content, that might be done by selecting the "close" user control 560.

Figure 6:
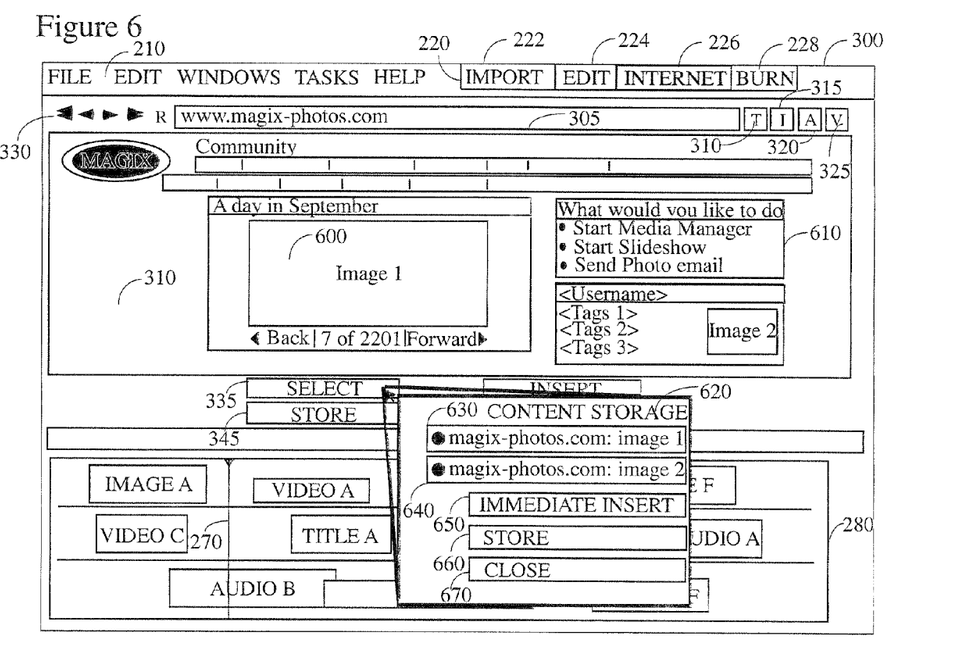
FIG. 6 describes the preferred graphical user interface of the instant invention when extracting image content from the Internet.

Now turning to FIG. 6, this figure illustrates the preferred graphical user interface of the instant invention as it might appear when extracting image content from a website. The user will preferably navigate to a website where he or she knows of image data (600 and 610) that is to be incorporated into the multimedia work. Upon reaching the target URL, the user will preferably initiate the extraction process by activating the quick access button 315 or by selecting the appropriate user control 335. The user will preferably be presented with a display 620 that provides a count of the number of image data items (630 and 640) on the currently viewed website. The user will be able to choose the "insert" option 650, wherein the image data will be extracted and automatically inserted into the multimedia work. The user will also preferably be able to direct that the content will be stored in nonvolatile storage 660. If the user wants to end the extraction process, he or she might do that by selecting the "close" user control 670.

Figure 7A:
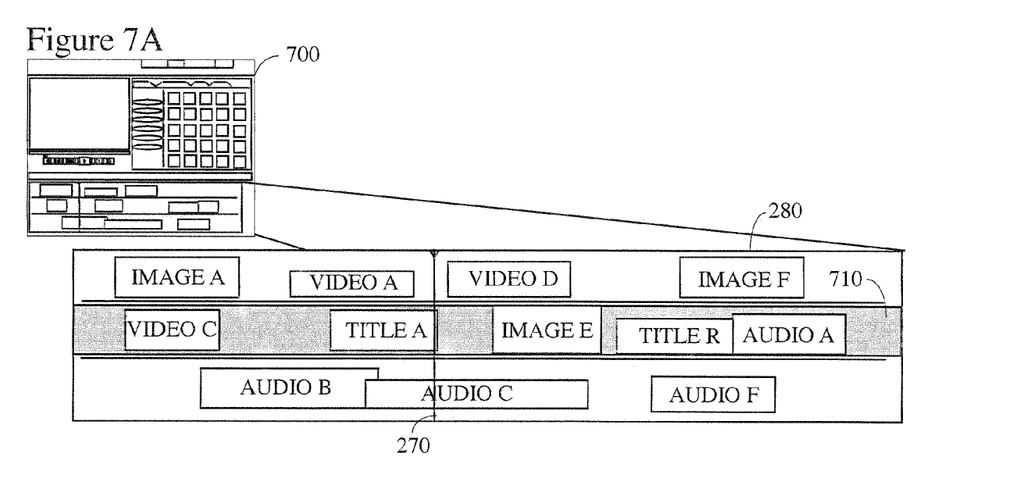
FIGS. 7A and 7B illustrate the preferred changes in the arranger section of the graphical user interface when integrating supplemental content from the Internet.
Figure 7B:
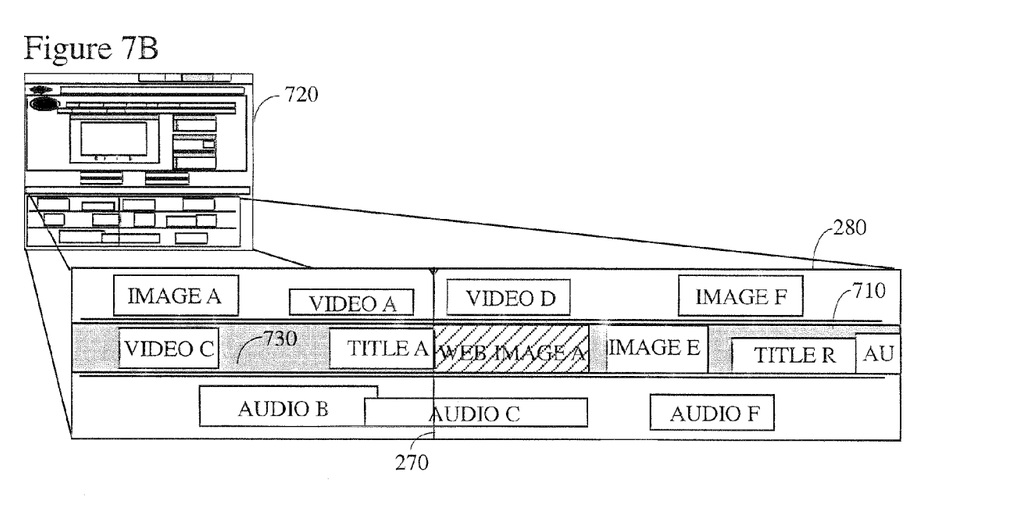

Turning next to FIGS. 7A and 7B, these figures illustrate how extracted media items might be represented in a multi-track arrangement 280. FIG. 7A illustrates the graphical user interface of the multimedia editing program 700 as it might appear in editing mode. The multi-track section of the graphical user interface 280 has been magnified for purpose of clarity. Additionally, FIG. 7A illustrates the case when the second track 710 has been selected by the user for editing. The graphical user interface of FIG. 7A also depicts the current status of the editing process via the highlighted notification bar 270.

FIG. 7B illustrates the preferred graphical user interface after the browsing component has been activated 720 and additionally contains a magnified representation of the multi-track arrangement 280. In FIG. 7B, the multi-track arrangement has been loaded with an image extracted from the Internet 730. This is indicated by the phrase "web image" associated with the added content. Additionally, the content has been inserted at the current editing position (illustrated by the notification bar 270). The existing content 730 will preferably be automatically rearranged accordingly to the running time of the newly extracted and inserted content. In case of static image content (e.g., a digital image), the instant invention will preferably default to display that image for a time of, for example five seconds. For audio content or video content, the instant invention will preferably incorporate the actual run time of each individual element. In some preferred embodiments, audio content might be inserted (and clips in the other tracks moved accordingly) or the inserted audio might be added as background audio, either replacing or augmenting the existing video and audio track.

Figure 8:
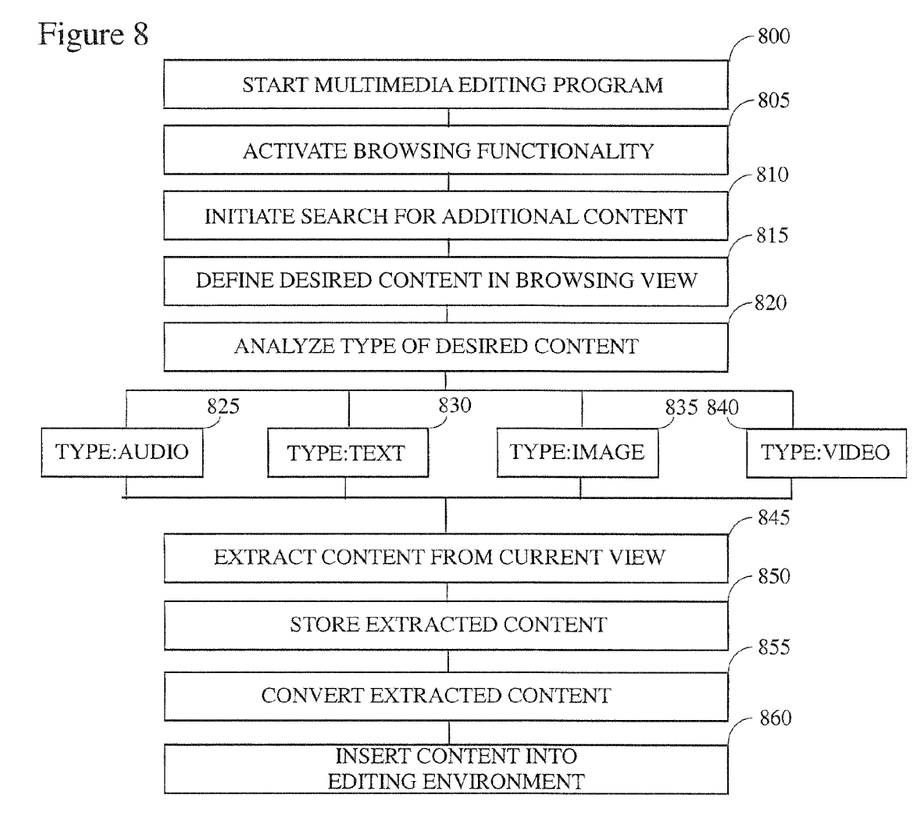
FIG. 8 depicts the preferred workflow of the instant invention.

Turning next to FIG. 8, this figure illustrates a preferred general workflow of the instant invention. As a first preferred step 800, the program will be started and initialized according to methods well known to those of ordinary skill in the art. Next the user will preferably activate the browsing component by selecting the appropriate user control 805. It will preferably not be required that the user must have previously created or started to create a multimedia work. The functionality of the instant invention will be applicable to an empty multi-track editor wherein the extracted multimedia content will be used to populate one or more of the empty tracks.

In the next preferred step, the user will begin searching for additional content 810 or start to navigate through the Internet. If the user detects interesting or potentially interesting content, he or she might select that content 820 by designating it with a mouse or similar interaction methods well known to those of ordinary skill in the art.

In the next step, the instant invention will preferably begin to analyze 820 the content selected by the user. The purpose of this analysis is to determine the multimedia type of the selected content, because each multimedia type may need to be processed according to a different scheme. The instant invention preferably will utilize a different processing sequence for each data type:

audio 825,
text 830,
image 835, and
video 840.

Preferably, the media type will be determined by an analysis of the source code of the currently viewed web page. However, it is also possible that the selection of a multimedia type by the user via the controls provided will be used by the instant invention to determine the subject data type.

Next, and preferably, the selected media item(s) will be extracted 845. Additional details of the instant invention are discussed in connection with FIGS. 11 to 14. In the next preferred step, the instant invention will store the extracted content 850, wherein this storage might be either in a temporary cache or in permanent storage for later selection by the user. The storage location decision will preferably be made by the user before initiating the extraction process; however, it is certainly possible that the instant invention might store the extracted content in a more permanent storage arrangement by default.

In the next preferred step, the instant invention will convert the selected data items to a compatible format (step 855) if necessary. Such a conversion might be necessary if the extracted content is stored in a format that is not supported by the editing program. In that case, and this primarily applies to audio and video content, the instant invention will preferably automatically convert and store the selected material. In the next step, the instant invention will preferably insert the content into one or more tracks of the editing program 860 at the current editing position. Additionally, and preferably, the content already present in the track(s) will be relocated in time or overwritten according to the user's preference.

Figure 9:
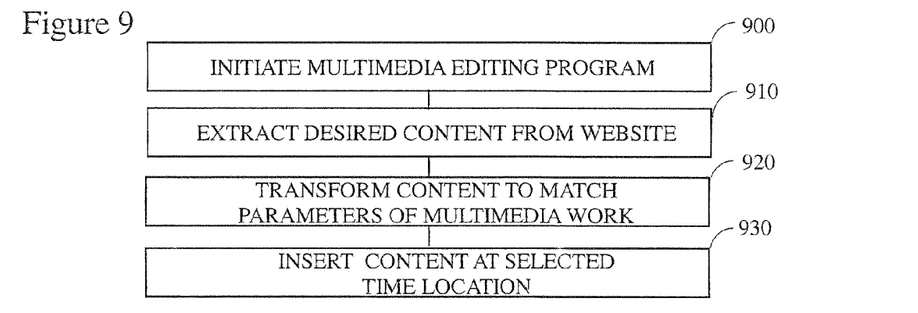
FIG. 9 illustrates a compact version of the workflow of the instant invention.

Turning now to FIG. 9, this figure contains a high level summary of some preferred steps of the instant invention. In a first preferred step, the multimedia editing program will be started and initialized 900 according to methods well known to those of ordinary skill in the art. In the next preferred step, the instant invention will extract selected content from a currently open website 910. The instant invention will then preferably automatically transform the extracted content to match the multimedia parameters of the current multimedia work 920 (e.g., image file type, video file type, image/video dimensions, etc.). As a next preferred step the instant invention will insert the extracted and converted content at the selected time location in the multimedia work 930.

Figure 10:
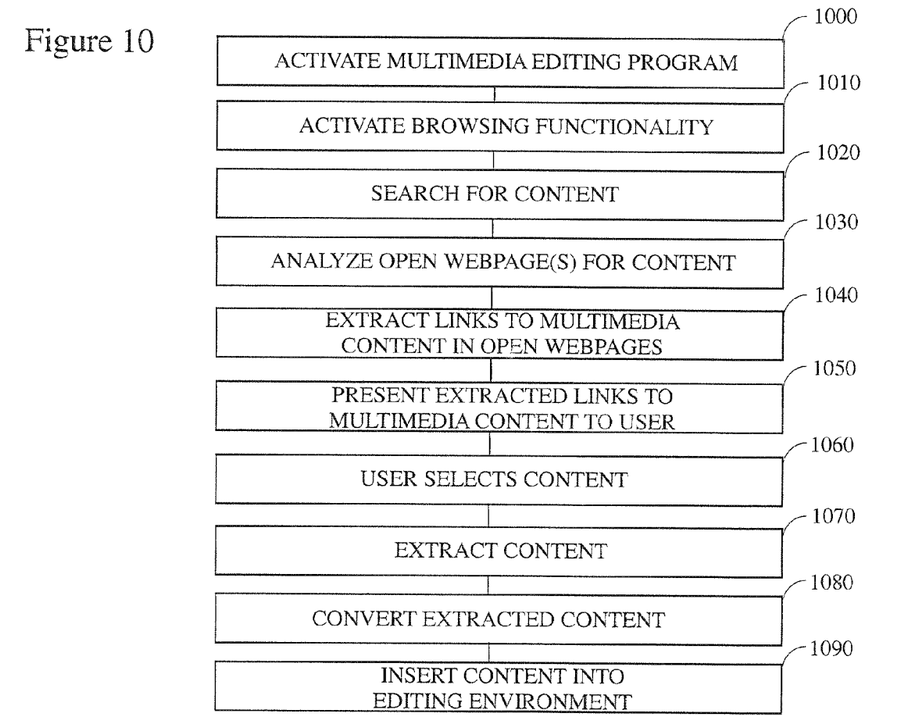
FIG. 10 illustrates the preferred workflow of the instant invention showing the steps of an alternative embodiment.

Considering FIG. 10, this figure illustrates the workflow of one preferred embodiment of the instant invention. In this variation, the user will not be required to seek out and select individual multimedia items on a web page but instead the user will be presented with a list of available content on the chosen page.

In a first preferred step 1000 the program will be started and initialized according to methods well known to those of ordinary skill in the art. Preferably the editing program will present the user with the editing functionality by default, and, in the next preferred step, the user will initiate the browsing functionality by selecting the corresponding user control 1010.

Using the browsing functionality within the editing program, the user will preferably initiate a search for content 1020 that will be included in the work, which search might be automatic (e.g., perusal of results provided by a search engine), manual (e.g., following a series of hypertext links), etc.

As a next preferred step, after the user has selected a web page this embodiment will initiate an analysis of the currently open page(s) 1030 in order to compile a list of all media items that would be available for download. This analysis will preferably feature an examination of the source code of each open web page (or website) to obtain links to multimedia content that would be suitable for use 1040. In the next preferred step, the instant invention will provide the media links to the user within a graphical user interface 1050. The provision of the links will preferably include information about the multimedia file (e.g., file size, format, etc.) together with a preview of the multimedia data, be it video, audio or image data.

In the next preferred step, the user will select content 1060 from the links offered and the instant invention will use the chosen links to extract the content from the website 1070. During the analysis step 1030, the instant invention will also preferably determine whether the format of the data is supported by the editing program. Therefore, as a next step, the instant invention will preferably convert the extracted content 1080 to a format that is supported by the editing program, if that is necessary. After the conversion process, the instant invention will preferably insert the content into the multimedia work at the current editing position 1090. If a format conversion is not necessary the instant invention will preferably insert the extracted content into the multimedia editing program in the form in which it was downloaded.

Figure 11:
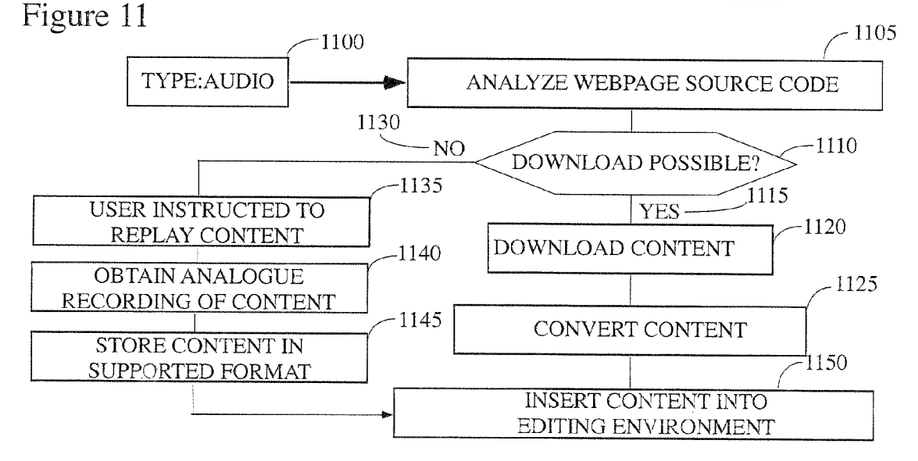
FIG. 11 depicts the preferred processing steps connected with the extraction of audio content from the Internet.

Turning next to FIG. 11, this figure illustrates some preferred processing steps that will be taken when extracting audio content 1100 from a website. As a first step, the instant invention will preferably execute an analysis of the source code of the selected webpage 1105. The analysis is intended to determine if a download of the desired content is possible 1110. If it is possible 1115, the instant invention will preferably download the content via the download link obtained through the analysis of the source code 1120. If the content is not supported by the multimedia editing program, the instant invention will preferably initiate a format conversion as a next preferred step 1125, whereafter the content will then be inserted into the multimedia editing program.

If however, a download is not possible 1130, the instant invention will ask the user to re-initiate the playback of the audio content 1135, which might be necessary in case that the audio is distributed through a replay-tool or present on the web page as background music. After the user starts the replay of the audio content, the instant invention will preferably perform an analog recording of the audio material 1140. After the replay has ended (e.g., as can be determined by a period of silence), the instant invention will store the recorded content in a format that is supported by the multimedia editing program 1145. After the recorded audio has been stored, the instant invention will then preferably insert the content into the editing 1150.

Figure 12:
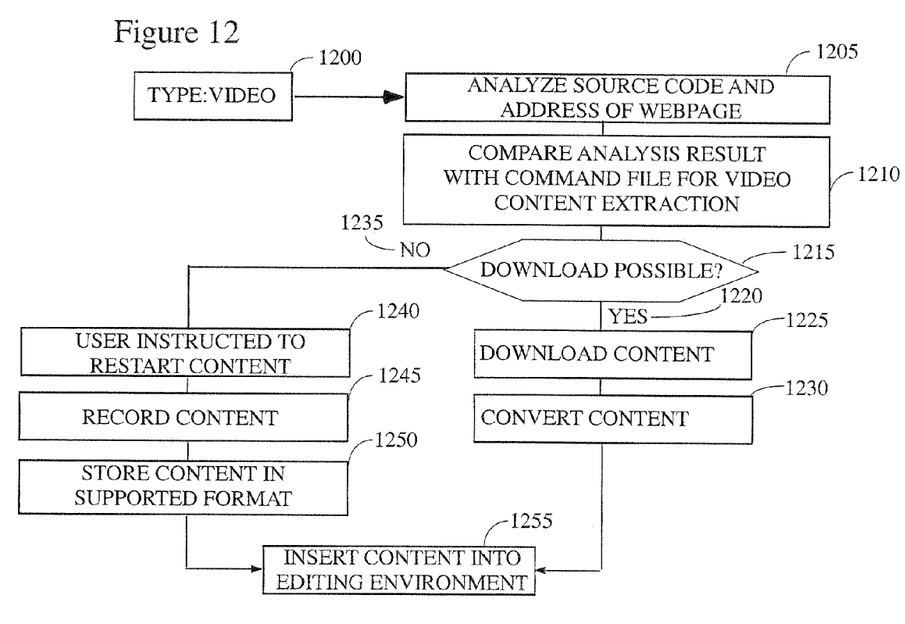
FIG. 12 illustrates the preferred processing steps connected with the extraction of video content from the Internet.

Now turning to FIG. 12, this figure illustrates the preferred processing steps of the instant invention when video content 1200 is extracted from a website. As a first preferred step, the instant invention will analyze the source code of the current website selection 1205. In a next preferred step, the instant invention will compare the result of the analysis step with a command file 1210.

The instructions in the command file will typically be customized for each web site (e.g., command strings might be provided for some of the more popular video sharing/distribution websites) and will be used to guide the extraction of video (or in some cases audio) content from those sites. For example, in some cases the instructions associated with a site might inform the instant invention how to use the dynamically generated filename of the currently viewed video to create a direct link to the underlying video file. Additionally, the command file might contain information about the expected format of the file that is to be downloaded (e.g., WMV, MPEG, etc.) and the instant invention could use that information to determine whether or not a conversion would be expected. Obviously, that expectation could be overruled if a different file type than was expected were to be encountered. In the preferred embodiment, the command file will be provided by the inventors and will be regularly updated via the Internet.

The comparison process will preferably include a check of the Internet address of the selected website and a comparison with a list of Internet addresses contained in the command file. Depending on the search results, the instant invention will be able to determine if a download of the selected video content will be possible 1215. If a download is possible 1220, the instant invention will download the video content 1225 and will additionally convert the video if the format is not supported by the multimedia editing program 1230. In the next preferred step, the instant invention will insert the converted video content into the multimedia editing program 1255.

If the video download link cannot be located within the command file, i.e. the video content is not directly accessible by the instant invention 1235, the user will be asked to start the playback of the video 1240 and the instant invention will then record the video content 1245 as it is played. In some preferred embodiments, the recording will be done via screen grabbing or, alternatively, by a frame wise screenshot approach as those terms are known to those of ordinary skill in the art. The audio content of the video material (if there is any) will preferably be simultaneously extracted, stored, and inserted in a manner comparable to the process described in connection with FIG. 11. As a next preferred step, the instant invention will store the recorded content in one of the formats supported by the editing program 1250. Finally, the instant invention will preferably insert the content into the multimedia editing program 1255 as has been described previously.

Figure 13:
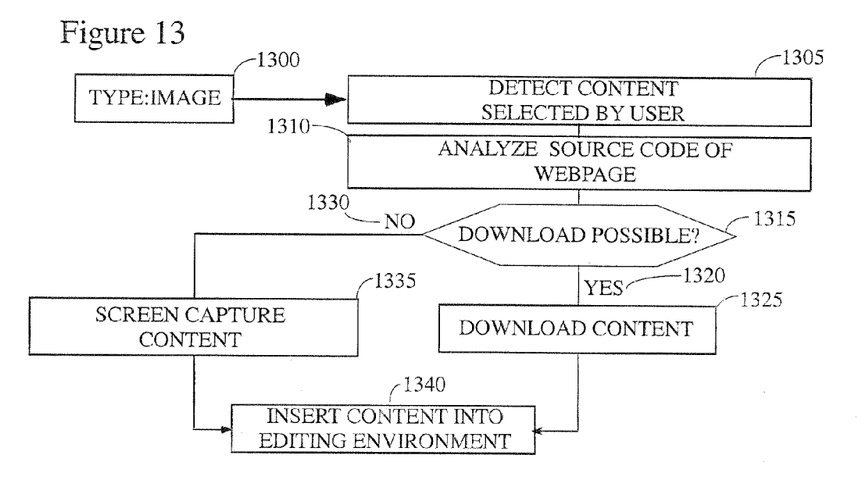
FIG. 13 depicts the preferred processing steps connected with the extraction of image content from the Internet.

Turning next to FIG. 13, this figure illustrates the preferred processing steps associated with the extraction and insertion of image data from a website 1300. In a first preferred step the instant invention will identify the image content selected by the user 1305. A user might signify a choice by using a mouse or any other interaction method.

In the next step, the instant invention will preferably analyze the source code of the website 1310, to determine if the desired content is available for download 1315. If such a download is possible 1320, the instant invention will download the selected content 1325 and will additionally preferably insert the content into the multimedia editing program 1340. If download of the image data is not possible 1330, the instant invention will preferably obtain an image 1335, by, for example, taking a screen snapshot. After a representation of the image has been examined, the instant invention will insert the content into the multimedia editing program 1340.

Figure 14:
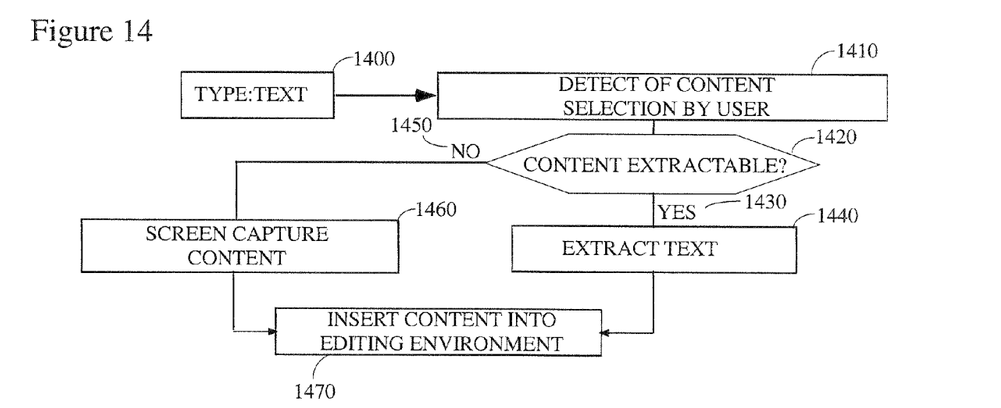
FIG. 14 illustrates the preferred processing steps connected with the extraction of textual content from the Internet.

Now turning to FIG. 14, this figure illustrates the preferred processing steps associated with the extraction of textual matter from a website 1400. As a first preferred step the instant invention will identify the content that has been selected by the user, be it via automatic selection of all of the text on a page or by manual selection of the text by the user 1410. In the next preferred step, the instant invention will determine if an extraction of the selected content is possible 1420. If it is 1430, the instant invention will extract the content 1440 and will afterwards insert it into the multimedia editing program 1470 as part of a title object or a preformatted text block depending on the user's preference. If it is determined that the selected content can not be extracted 1450, the instant invention will preferably automatically collect a screenshot that captures the desired section 1460 and the instant invention will then insert the captured content into the multimedia editing program 1470.

CONCLUSIONS

Of course, many modifications and extensions could be made to the instant invention by those of ordinary skill in the art. For example, in one preferred embodiment, the browsing component of the instant invention will be able to access the cache of Internet browsers (e.g., Explorer, Safari, FireFox, etc.) and would be able to import content found there (depending on format and size) into the multimedia work and/or stored outside of the cache. Stored data could provide a source of content suitable for use in a multimedia work. In this embodiment, preferably, a graphical user interface would present the user with a representation of the images, audio files, video files and text data found within the system cache.

Obviously, one important aspect of the instant invention is performing the multimedia work after it has been created. For purposes of the instant disclosure, a "performance" will be broadly interpreted instances where the user plays the multimedia file on his or a computer display as well as instances where the performance takes place on a personal media player (e.g., an MP3 player), via a screen projector, TV set, etc. In short, a performance will occur any time the multimedia work is experienced using current or future technology.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:
1. A method of creating a digital multimedia work, comprising the steps of:
   (a) activating a multimedia editing program having an Internet browser function integral thereto;
   (b) creating a version of said digital multimedia work within said program;
   (c) within said program, activating said Internet browser function;
   (d) within said program, selecting an insertion location representing a point in time within a timeline of said version of said digital multimedia work;
   (e) using said Internet browser function to navigate to a web site;
   (f) displaying at least a portion of said web site to a user using said Internet browser function;
   (g) automatically identifying at least one media item on said displayed portion of said web site;
   (h) presenting to a user a representation of said identified media item;
   (i) requiring said user to select said representation of said identified media item from said displayed portion of said web site, thereby selecting said identified media item;
   (j) analyzing source code associated with said selected media item;

(k) in response to said analysis, determining if said selected media item is downloadable,
(k1) upon determining said media item is downloadable, automatically downloading said selected media item,
(k2) upon determining said media item is not downloadable, instructing the user to initiate playback of said selected media item; and,
(k3) automatically screen-capturing a representation of said selected media item during said playback;
(l) using said program to automatically incorporate said downloaded or screen-captured media item into said version of said digital multimedia work at said selected insertion location without further user direction, thereby creating said digital multimedia work; and,
(m) storing said digital multimedia work on a computer readable medium.

2. The method according to claim 1, further comprising the steps of:
(n) reading at least a portion of said stored digital multimedia work from said computer readable medium; and,
(o) performing said read portion of said digital multimedia work.

3. The method according to claim 1, wherein said identified media item is selected from a group consisting of a text item, a video item, an audio item, and a video item having at least one audio track.

4. The method according to claim 1, wherein step (e) comprises the steps of:
(e1) providing an Internet address to said Internet browser function; and,
(e2) displaying the content of said Internet address using said Internet browser function.

* * * * *